United States Patent
Zhou

(10) Patent No.: US 9,986,260 B2
(45) Date of Patent: May 29, 2018

(54) CENSUS TRANSFORM DATA COMPRESSION METHODS AND SYSTEMS

(71) Applicant: Avago Technologies General IP (Singapore) Pte. Ltd., Singapore (SG)

(72) Inventor: Minhua Zhou, San Diego, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 633 days.

(21) Appl. No.: 14/542,190

(22) Filed: Nov. 14, 2014

(65) Prior Publication Data

US 2016/0142736 A1   May 19, 2016

(51) Int. Cl.
*H04N 19/61*   (2014.01)

(52) U.S. Cl.
CPC .................................. *H04N 19/61* (2014.11)

(58) Field of Classification Search
None
See application file for complete search history.

(56) References Cited

U.S. PATENT DOCUMENTS

| | | | | |
|---|---|---|---|---|
| 2004/0194008 A1* | 9/2004 | Garudadri | ............. | H03M 13/29 714/821 |
| 2008/0187042 A1* | 8/2008 | Jasinschi | ............. | H04N 19/176 375/240.03 |
| 2009/0110076 A1* | 4/2009 | Chen | ............. | G06T 7/20 375/240.16 |
| 2012/0044998 A1* | 2/2012 | Kokaram | ............. | G06T 7/238 375/240.16 |
| 2012/0082212 A1* | 4/2012 | Sadafale | ............. | G06F 17/147 375/240.2 |
| 2013/0121401 A1* | 5/2013 | Zheludkov | ............. | H04N 19/65 375/240.02 |
| 2014/0362230 A1* | 12/2014 | Bulan | ............. | G06K 9/00624 348/169 |
| 2015/0117704 A1* | 4/2015 | Bulan | ............. | G06T 7/20 382/103 |
| 2015/0254292 A1* | 9/2015 | Khan | ............. | G06F 17/30303 707/741 |
| 2015/0365696 A1* | 12/2015 | Garud | ............. | H04N 19/53 375/240.08 |
| 2016/0364875 A1* | 12/2016 | Seki | ............. | G06T 7/0075 |

\* cited by examiner

*Primary Examiner* — Reza Aghevli
(74) *Attorney, Agent, or Firm* — Sterne, Kessler, Goldstein & Fox P.L.L.C.

(57) ABSTRACT

An video image processing device configured to generate one or more census digit planes, and to generate one or more signature vectors based on the one or more census digit planes. The video image processing device can include one or more census transforms configured to perform one or more census transformations to generate the signature vector(s) based on the census digit plane(s).

20 Claims, 9 Drawing Sheets

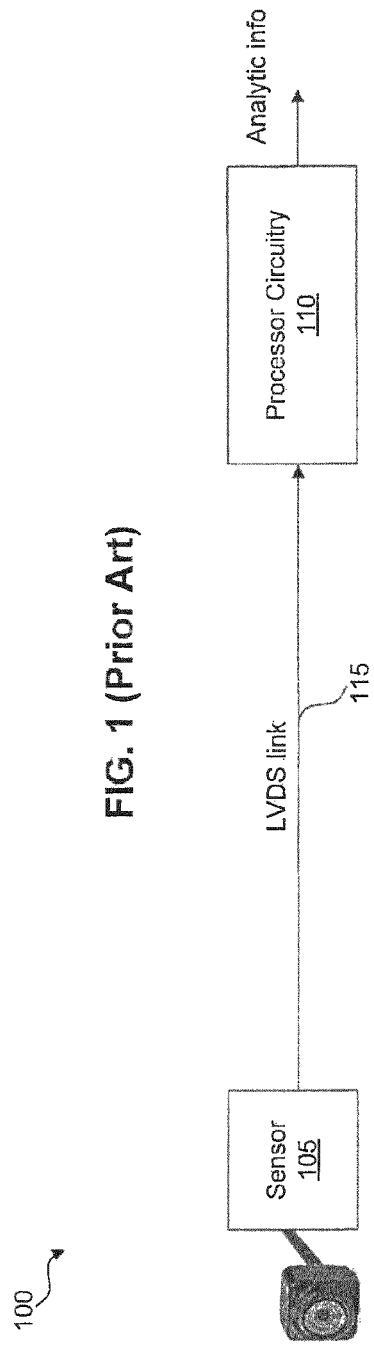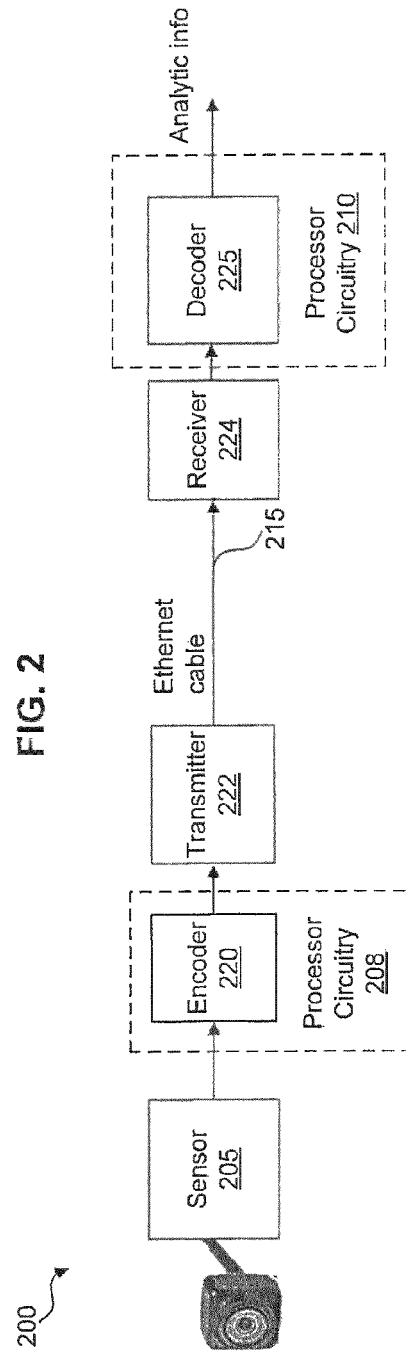

| 32 | 24 | 82 |
|---|---|---|
| 74 | 62 | 112 |
| 125 | 62 | 156 |

FIG. 4A
405
Intensity values

| 1 | 0 | 0 |
|---|---|---|
| 1 | P | 1 |
| 1 | 1 | 1 |

FIG. 4B
410
Census digits 11001111
415

FIG. 4C
Signature vector

| 32 | 24 | 82 |
|---|---|---|
| 74 | 62 | 112 |
| 125 | 62 | 156 |

FIG. 5A
505
Intensity values

| 1 | 0 | 2 |
|---|---|---|
| 2 | P | 2 |
| 2 | 1 | 2 |

FIG. 5B
510
Census digits 21002221
515

FIG. 5C
Signature vector

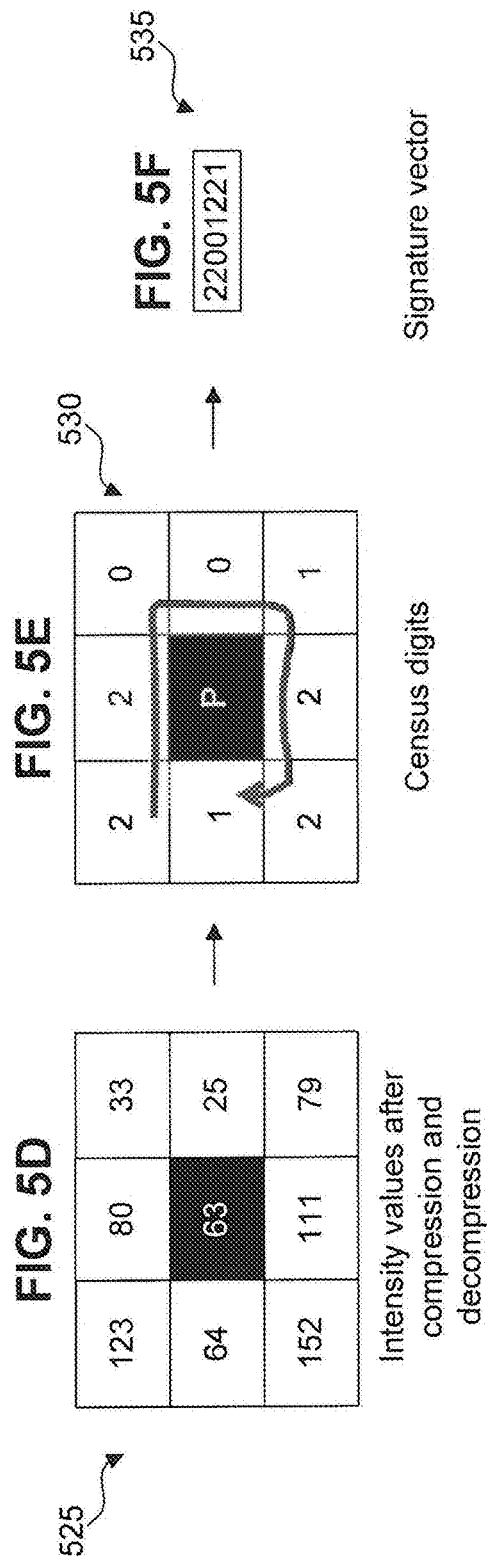

Census digits for $P_{(x,y)}$

Signature vector for $P_{x,y}$

Intensity values

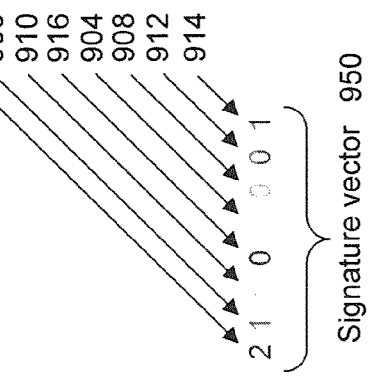
FIG. 9E
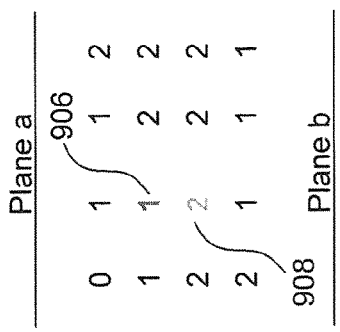
FIG. 9A
FIG. 9B
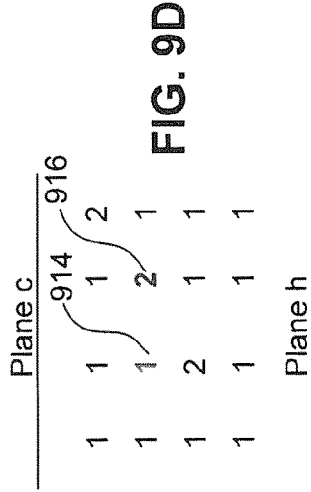
FIG. 9C
FIG. 9D
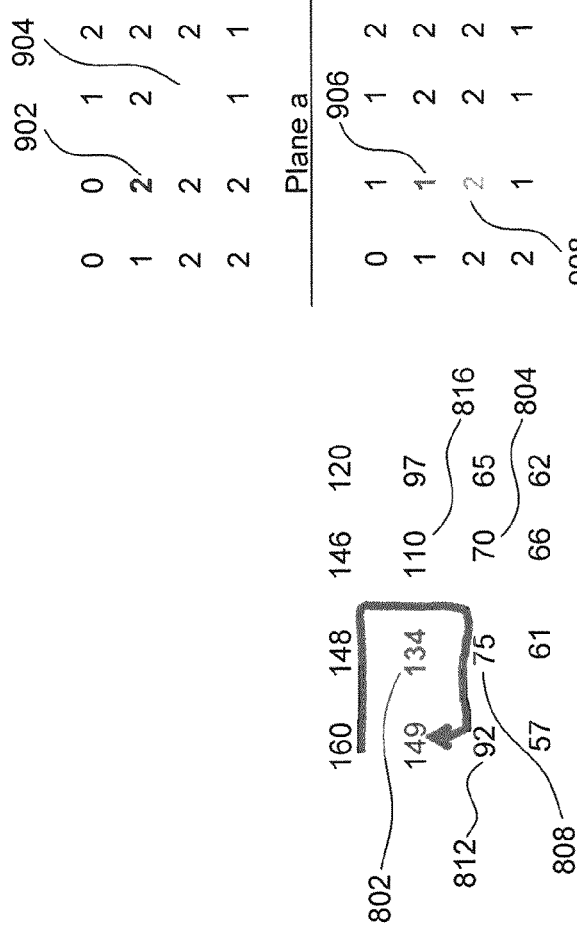
FIG. 8

FIG. 10A
Census digits planes (uncompressed)

| 0 | 0 | 1 | 2 | 2 |
|---|---|---|---|---|
| 1 | 1 | 2 | 2 | 2 |
| 2 | 2 | 2 | 2 | 2 |
| 2 | 2 | 1 | 1 | 1 |

Plane a

| 0 | 1 | 1 | 2 | 2 |
|---|---|---|---|---|
| 1 | 1 | 1 | 2 | 2 |
| 2 | 2 | 2 | 2 | 2 |
| 2 | 1 | 1 | 1 | 1 |

Plane b

| 1 | 1 | 1 | 1 | 1 |
|---|---|---|---|---|
| 1 | 1 | 1 | 0 | 0 |
| 2 | 2 | 2 | 2 | 2 |
| 1 | 1 | 1 | 1 | 1 |

Plane c

| 1 | 1 | 1 | 2 | 2 |
|---|---|---|---|---|
| 1 | 1 | 2 | 1 | 1 |
| 2 | 2 | 1 | 1 | 1 |
| 1 | 1 | 1 | 1 | 1 |

Plane h

FIG. 10B
Census digits planes (decompressed)

| 0 | 0 | 1 | 1 | 2 |
|---|---|---|---|---|
| 1 | 1 | 2 | 2 | 2 |
| 2 | 2 | 2 | 2 | 2 |
| 2 | 2 | 2 | 2 | 1 |

Plane a

| 1 | 1 | 1 | 1 | 1 |
|---|---|---|---|---|
| 2 | 2 | 2 | 2 | 1 |
| 2 | 2 | 2 | 2 | 2 |
| 2 | 2 | 2 | 2 | 1 |

Plane b

| 1 | 1 | 1 | 0 | 0 |
|---|---|---|---|---|
| 2 | 1 | 1 | 1 | 1 |
| 2 | 2 | 2 | 2 | 1 |
| 2 | 2 | 2 | 2 | 1 |

Plane c

| 0 | 1 | 1 | 2 | 2 |
|---|---|---|---|---|
| 1 | 1 | 1 | 1 | 1 |
| 1 | 1 | 1 | 1 | 1 |
| 1 | 1 | 1 | 1 | 1 |

Plane h

FIG. 10C
Census digits planes (residual)

| 0 | 0 | 0 | −1 | 0 |
|---|---|---|---|---|
| 0 | 0 | 0 | 0 | 0 |
| 0 | 0 | 0 | 0 | 0 |
| 0 | 0 | −1 | 0 | 0 |

Plane a

| −1 | 0 | 0 | 0 | 1 |
|---|---|---|---|---|
| −1 | −1 | −1 | 0 | 1 |
| 0 | 0 | 0 | 0 | 0 |
| 0 | 0 | −1 | −1 | 0 |

Plane b

| 0 | 0 | 0 | 1 | 1 |
|---|---|---|---|---|
| −1 | 0 | 0 | −1 | −1 |
| 0 | 0 | 0 | 0 | 0 |
| 0 | 0 | −1 | −1 | 0 |

Plane c

| 1 | 0 | 0 | 0 | 0 |
|---|---|---|---|---|
| 0 | 0 | 0 | 1 | 0 |
| 0 | 0 | 1 | 0 | 0 |
| 0 | 0 | 0 | 0 | 0 |

Plane h

CENSUS TRANSFORM DATA COMPRESSION METHODS AND SYSTEMS

BACKGROUND

Field

This application relates generally to data compression, including data compression using census transforms.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 illustrates an example data processing system.

FIG. 2 illustrates a data processing system according to an exemplary embodiment of the present disclosure.

FIG. 4A illustrates example pixel intensity values according to an exemplary embodiment of the present disclosure.

FIG. 4B illustrates example census digit values according to an exemplary embodiment of the present disclosure.

FIG. 4C illustrates an example signature vector according to an exemplary embodiment of the present disclosure.

FIG. 5A illustrates example pixel intensity values according to an exemplary embodiment of the present disclosure.

FIG. 5B illustrates example census digit values according to an exemplary embodiment of the present disclosure.

FIG. 5C illustrates an example signature vector according to an exemplary embodiment of the present disclosure.

FIG. 5D illustrates example pixel intensity values according to an exemplary embodiment of the present disclosure.

FIG. 5E illustrates example census digit values according to an exemplary embodiment of the present disclosure.

FIG. 5F illustrates an example signature vector according to an exemplary embodiment of the present disclosure.

FIG. 8 illustrates example pixel intensity values according to an exemplary embodiment of the present disclosure.

FIGS. 9A-9D illustrate census digit planes according to exemplary embodiments of the present disclosure.

FIG. 9E illustrate an example signature vector according to exemplary embodiments of the present disclosure.

FIGS. 10A-10B illustrate census digit planes according to exemplary embodiments of the present disclosure.

FIG. 10C illustrates residual census digit planes according to an exemplary embodiment of the present disclosure.

The embodiments of the present disclosure will be described with reference to the accompanying drawings. The drawing in which an element first appears is typically indicated by the leftmost digit(s) in the corresponding reference number.

DETAILED DESCRIPTION

Figure 3:
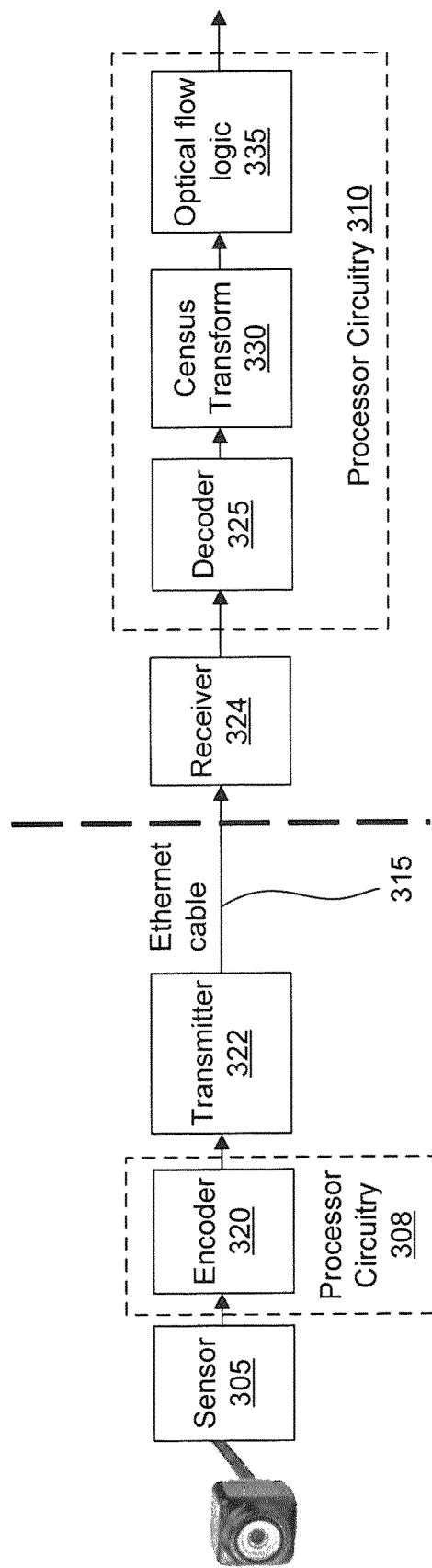
FIG. 3 illustrates a data processing system according to an exemplary embodiment of the present disclosure.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

The term "module" shall be understood to include one of software, firmware, hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

FIG. 1 illustrates a conventional data processing system 100. The data processing system 100 includes one or more sensors 105 communicatively coupled to a processing module 110 via a communication link 115. The communication link 115 can be any well-known communication link (e.g., electrical link, optical link, etc.) as would be understood by those of ordinary skill in the relevant arts. For example, the communication link 115 can be a low-voltage differential signaling (LVDS) communication link.

One or more of the sensors 105 can include one or more processors, circuitry, and/or logic that are configured to detect or measure one or more physical properties (e.g., light, sound, position, image, video, etc.) and generate a corresponding output signal. For example, the one or more sensors 105 can be one or more image sensors configured to convert one or more optical images into one or more electrical signals. In operation, the image sensor(s) 105 can provide, for example, uncompressed or compressed video data to the processing module 110 via the communication link 115. In this example, the sensor(s) 105 can be referred to as image sensor(s) 105 and can be any well-known image sensor as would be understood by those skilled in the relevant arts. It should be appreciated that the sensor(s) 105 are not limited to image sensors, and the sensor(s) 105 can be any well-known sensor as would be understood by one of ordinary skill in the relevant arts without departing from the spirit can scope of the present disclosure.

The processing module 110 can include one or more processors (CPUs) and/or circuits configured to process one or more signals received from the sensor(s) 105 and/or to carry out instructions to perform arithmetical, logical, and/or input/output (I/O) operations of the data processing system 100. The processing module 110 can be configured to generate processed data based on the processing of the one or more signals. The processing module 110 can then provide the processed data to one or more other components of the data processing system 100, and/or to one or more other components and/or systems in communication with the data processing system 100. The processing module 110 can further include any well-known memory that stores data and/or instructions, where when the instructions are executed by the processor(s), perform the functions described herein.

FIG. 2 illustrates a data processing system 200 according to an exemplary embodiment of the present disclosure. The data processing system 200 includes one or more sensors 205, processor circuitry 208, which can include an encoder 220, transmitter 222, receiver 224, and processor circuitry 210, which can include a decoder 225. The one or more sensors 205 can be communicatively coupled to the processor circuitry 208, which is communicatively coupled to the transmitter 222. The transmitter 222 can be communicatively coupled to the receiver 224 (via communication link 215), which can be communicatively coupled to the processor circuitry 210.

The communication link 215 can be any well-known communication link (e.g., electrical link, optical link, etc.) as would be understood by those of ordinary skill in the relevant arts. In an exemplary embodiment, the communication link 215 is a communication link conforming to, and configured to utilize, the Ethernet protocol as standardized in the Institute of Electrical and Electronics Engineers (IEEE) 802.3 standard, which is incorporated herein by reference in its entirety. Further, those skilled in the relevant art(s) will understand that the communication link 215 is not limited to wired communication technologies and can be configured for communications that conform to one or more well-known wireless technologies (e.g., WLAN, Bluetooth, NFC, RFID, infrared, etc.) in addition to, or alternatively to, the Ethernet protocol and/or one or more other well-known wired technologies.

The sensor(s) 205 can include one or more processors, circuitry, and/or logic that are configured to detect or measure one or more physical properties (e.g., light, sound, position, etc.) and generate a corresponding output signal. In an exemplary embodiment, the sensor(s) 205 can be one or more image sensors configured to convert one or more optical images and/or video images into one or more electrical signals. In this example, the sensor(s) 205 can be referred to as image sensor(s) 205. In operation, the image sensor(s) 205 can provide, for example, uncompressed or compressed video data to the encoder 220. In an exemplary embodiment, the image sensor(s) 205 provide uncompressed video data to the encoder 220 for further processing by the encoder 220 as discussed in detail below. In this example, the encoder 220 can be referred to as video encoder 220. It should be appreciated that the sensor(s) 205 are not limited to image sensors, and the sensor(s) 205 can be any well-known sensor as would be understood by one of ordinary skill in the relevant arts without departing from the spirit can scope of the present disclosure.

The processor circuitry 208 can include one or more processors (CPUs) and/or circuits configured to process data received from the senor 205 and/or to carry out instructions to perform arithmetical, logical, and/or input/output (I/O) operations of the data processing system 200. For example, the processor circuitry 208 can be configured to process uncompressed video data received from the sensor 205. The processor circuitry 208 can be configured to generate processed video image data based on the processing of the uncompressed video data from the sensor 208. The processor circuitry 208 can then provide the processed video data to the transmitter 222 for transmission to one or more other components of the data processing system 200 (e.g., receiver 224). In an exemplary embodiment, the processor circuitry 208 can include an encoder (e.g. encoder 220) that is configured to perform one or more encoding and/or compression operations.

The Encoder 220 can include one or more processors, circuitry, and/or logic that are configured to perform one or more encoding and/or compression operations to convert data from one or more formats and/or codes to one or more other formats and/or codes. The encoder 220 can also be configured to perform lossless or lossy compression on data through one or more of the encoding operations. The encoding operations can utilize one or more well-known codecs and/or compression algorithms—such as, for example, Motion-JPEG, MPEG AVC/ITU-T H.264, MPEG HEVC/ITU-T H.265, JPEG2000, MPEG-1, MPEG-2, MPEG-4, H.261, H.263, H.263++, VP8/9, VC1, and/or AVS—to encode and/or compress data. In exemplary embodiments in which the image sensor(s) 205 provide image and/or video data to the encoder 220, the encoder 220 (referred to as "video encoder 220" in these examples) can be configured to perform one or more well-known video encoding and/or compression operations utilizing one or more well-known video codec and/or compression algorithms to generate an encoded/compressed video bitstream. It should be appreciated that the encoder 220 is not limited to video encoding/compression configurations and the encoder 220 can be configured to perform encoding and/or compression operations on one or more other types of data (e.g., audio, speech, etc.) as would be understood by one of ordinary skill in the relevant arts.

In an exemplary embodiment, the encoder 220 can include one or more processors, circuitry, and/or logic that are configured to perform one or more decoding and/or decompression operations in addition to the encoding and/or compression operations. For example, the encoder 220 can be configured perform inverse operations to the encoding/compression operations to generate decompressed video image data. In this example, the decompressed video image data represents video image data that has been compressed and then subsequently decompressed.

In operation, the video encoder 220 can be configured to receive, for example, uncompressed video data from the image sensor 205 and perform one or more encoding and/or compression operations on the video data to generate an encoded/compressed video bitstream. In an exemplary embodiment, the encoded video bitstream can be in a compressed format when compared to the video data received from the sensor 205. In this example, the encoded video bitstream can be referred to as a "compressed video bitstream." The video encoder 220 can be configured to provide the encoded/compressed video bitstream to transmitter 222, which can be configured to transmit the encoded/ compressed video bitstream to the decoder 225 via the Ethernet communication link 215 utilizing the transmitter 222 and receiver 224, as discussed in detail below.

The processor circuitry 208 can further include a memory (or access an external memory) that stores data and/or instructions, where when the instructions are executed by the processor(s), perform the functions described herein. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The transmitter 222 can include one or more processors, circuitry, and/or logic that are configured to transmit data via one or more wired technologies to one or more components (e.g., receiver 224) within the data processing system 200 and/or to one or more devices in communication with the data processing system 200. In an exemplary embodiment, the transmitter 222 is configured to transmit data utilizing and/or conforming to the Ethernet protocol. In this example, the transmitter 222 can be referred to as Ethernet transmitter 222. The transmitter 222 is not limited to configurations utilizing the Ethernet protocol, and the transmitter 222 can be configured to transmit data utilizing one or more well-known wired and/or wireless communication technologies as would be understood by those skilled in the relevant art(s) in addition to, or alternatively to, the Ethernet protocol.

Those skilled in the relevant art(s) will recognize that the transmitter 222 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples.

Further, those skilled in the relevant art(s) will recognize that the transmitter 222 can also be configured to receive data via one or more wired technologies from one or more components (e.g., receiver 224) within the data processing system 200 and/or from one or more devices in communication within the data processing system 200. In this example, the transmitter 222 is configured to transmit and/or receive data and can be referred to as transceiver 222.

The receiver 224 can include one or more processors, circuitry, and/or logic that are configured to receive data via one or more wired technologies from one or more components (e.g., transmitter 222) within the data processing system 200 and/or from one or more devices in communication with the data processing system 200. In an exemplary embodiment, the receiver 224 is configured to receive encoded/compressed video data from the transmitter 222 and to provide the received data to, for example, to processor circuitry 210 (and decoder 225) for further processing as discussed in detail below.

In an exemplary embodiment, the receiver 224 is configured to receive data utilizing and/or conforming to the Ethernet protocol. In this example, the receiver 224 can be referred to as Ethernet receiver 224. The receiver 224 is not limited to configurations utilizing the Ethernet protocol, and the receiver 224 can be configured to receive data utilizing one or more well-known wired and/or wireless communication technologies as would be understood by those skilled in the relevant art(s) in addition to, or alternatively to, the Ethernet protocol.

Those skilled in the relevant art(s) will recognize that the receiver 224 can also include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples.

Further, those skilled in the relevant art(s) will recognize that the receiver 224 can also be configured to transmit data via one or more wired technologies to one or more components (e.g., transmitter 222) within the data processing system 200 and/or to one or more devices in communication with the data processing system 200. In this example, the receiver 224 is configured to transmit and/or receive data and can be referred to as transceiver 224.

The processor circuitry 210 is similar to the processor circuitry 208 and can include one or more processors (CPUs) and/or circuits configured to process data received from, for example, the receiver 224, and/or to carry out instructions to perform arithmetical, logical, and/or input/output (I/O) operations of the data processing system 200. For example, the processor circuitry 210 can be configured to process encoded/compressed video data received from the receiver 224. The processor circuitry 210 can be configured to generate processed video image data based on the processing of the encoded/compressed video data received from the receiver 224. The processor circuitry 210 can then provide the processed data to one or more other components of the data processing system 200, and/or to one or more other components and/or systems in communication with the data processing system 200. In an exemplary embodiment, the processor circuitry 210 can include a decoder (e.g. decoder 225) that is configured to perform one or more decoding and/or decompression operations.

Decoder 225 can include one or more processors, circuitry, and/or logic that are configured to perform one or more decoding and/or decompression operations to convert data from one or more formats and/or codes to one or more other formats and/or codes. For example, the decoder 225 can be configured perform inverse operations to encoding/compression operations performed by the encoder 220. The decoder 225 can also be configured to perform lossless or lossy decompression of data through one or more of the decoding operations. The decoding operations can utilize one or more well-known codecs and/or decompression algorithms—such as, for example, Motion-JPEG, MPEG AVC/ITU-T H.264, MPEG HEVC/ITU-T H.265, JPEG2000, MPEG-1, MPEG-2, MPEG-4, H.261, H.263, H.263++, VP8/9, VC1, and/or AVS—to decode and/or decompress data. In exemplary embodiments in which the image sensor(s) 205 provide image and/or video data to the encoder 220, the decoder 225 (hereinafter "video decoder 225") can be configured to perform one or more well-known video decoding and/or decompression operations utilizing one or more well-known video codec and/or decompression algorithms. It should be appreciated that the decoder 225 is not limited to video decoding/decompression configurations and the decoder 225 can be configured to perform decoding and/or decompression operations on one or more other types of data (e.g., audio, speech, etc.) as would be understood by one of ordinary skill in the relevant arts.

In operation, the video decoder 225 can be configured to receive the encoded/compressed video bitstream from the receiver 224, and perform one or more decoding and/or decompression operations on the encoded/compressed video bitstream to generate decoded/decompressed video data. In this example, the decoded/decompressed video data can be in the same format as the video data provided to the video encoder 220 by the image sensor 205, or can be in a different format as the video data. In an exemplary embodiment, the decoded/decompressed video data can represent an uncompressed version of the encoded/compressed video bitstream received by the decoder 225 from the receiver 224. In this example, the decoded/decompressed video data can be referred to as "decompressed video data." Further, the decoded/decompressed video data can represent a lossy or lossless version of video data provided to the video encoder 220. The video decoder 225 can be configured to provide the decoded/decompressed video data to one or more other components of the data processing system 200, and/or to one or more other components and/or systems in communication with the data processing system 200.

The processor circuitry 210 can further include a memory (or access an external memory) that stores data and/or instructions, where when the instructions are executed by the processor(s), perform the functions described herein. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

In an exemplary embodiment, the data processing system 200 (and/or one or more other systems and/or embodiments described herein) can be implemented in, for example, an automobile. In this example, one or more of the exemplary embodiments described herein can be implemented in (or utilized with) an Advanced Driver Assistance System (ADAS). ADAS is a system developed to assist an operator in the operation of the automobile and to improve the safety, comfort, and/or efficiency of operating the vehicle. Advanced Driver Assistance systems (ADAS) can include adaptive cruise control, adaptive headlight positioning, lane departure warning and control, collision avoidance, night vision, pedestrian protection and avoidance, parking assistance, blind spot detection, driver drowsiness detection, traffic sign detection, speed limit notification, hazard warning, predictive cruise control, and/or adaptive shift control to provide some examples. ADAS can use one or more sensing devices (e.g., sensor 205) in the vehicle to determine the current state of the vehicle and the current state of the surrounding environment, including the state of the roadway. These sensor devices may include, for example, image and/or video, radar, infrared, ultrasonic, and/or LIDAR devices.

As will be appreciated, ADAS can derive analytical information from image sensors by processing image data from the sensor. In this example, the image data is typically delivered to the processing unit for subsequent display and for image processing through a communication link. As shown in FIG. 1, data can be transmitted using an LVDS communication link. To reduce cost and improve interoperability, and as shown in FIG. 2, a system can employ an Ethernet communication link that can provide, for example, a data rate of approximately 100 Mbit/sec, or a data rate up to approximately 1 Gbit/sec in later Ethernet generations. In utilizing an Ethernet communication link offering such data rates, systems can utilize data compression operations to reduce the size of the data transmissions via the Ethernet communication link. As described in more detail below, one or more exemplary embodiments can employ systems to compensate for degraded image data quality that may be introduced by one or more compression/decompression processes.

FIG. 3 illustrates a data processing system 300 according to an exemplary embodiment of the present disclosure. The data processing system 300 is similar to the data processing system 200 as illustrated in FIG. 2, and includes one or more sensors 305, processor circuitry 308 (that may include an encoder 320), a transmitter 322, a receiver 324, and processor circuitry 310 (that may include a decoder 325, census transform 330, and optical flow logic 335). The sensor(s) 305, the processor circuitry 308, the encoder 320, the transmitter 322, receiver 324, the processor circuitry 310, and the decoder 325 can be similar to the sensor(s) 205, the processor circuitry 208, the encoder 220, the processor circuitry 210, and the decoder 325 of FIG. 2, and discussion of similar functionality and/or configurations may have been omitted for brevity.

The processor circuitry 310 is one embodiment of the processor circuitry 210 illustrated in FIG. 2, and includes decoder 325, census transform 330 and/or optical flow logic 335. The processor circuitry 310 includes one or more processors (CPUs) and/or circuits configured to process image data received from, for example, receiver 324 and/or to carry out instructions to perform arithmetical, logical, and/or input/output (I/O) operations of the data processing system 300. In an exemplary embodiment, the processor circuitry 310 is configured to process image data and determine pixel intensity values for one or more pixels of the image data. Using the census transform 330 and the optical flow logic 335, the processor circuitry 310 can be configured to perform census transformations and/or optical flow computations, respectively, on the image data as explained in detail below.

The census transform 330 includes one or more processors, circuitry, logic and/or code that are configured to perform one or more image processing operations utilizing a census transform. In an exemplary embodiment, the census transform is a non-parametric local transform that maps one or more neighboring pixels surrounding a pixel P to a bit string. In operation, the census transform can be invariant under monotonically increasing grey value transformations, thereby forming a basis of an illumination-robust constancy assumption.

The optical flow logic 335 includes one or more processors, circuitry, logic and/or code that are configured to perform one or more optical flow computations to generate optical flow information based on information resulting from the imaging processing operations performed by the census transform 330. In exemplary embodiment, optical flow information is the pattern of apparent motion of objects, surfaces, and edges in an image and/or visual scene that may be caused by the relative motion between an observer (e.g., an image sensor, human, etc.) and the image/scene.

In an exemplary embodiment, the census transform d (P,P') can satisfy Equation 1 provided below:

$$d(P, P') = \begin{cases} 0 \text{ if } P > P' \\ 1 \text{ if } P \leq P' \end{cases} \quad \text{Equation 1}$$

where P is the central pixel intensity value and P' is the pixel intensity value of a neighboring pixel.

FIGS. 4A-4C illustrate example pixel intensity values 405, example census digits 410, an exemplary signature vector 415, and an exemplary operation of the census transform 330 utilizing Equation 1. In operation, the census transform 330 performs one or more census transformations on image data to generate a bit stream corresponding to pixel intensities of an image. The generated bit stream can be referred to as a "signature vector." For example, as illustrated in FIG. 4A, the intensity value P of the central pixel is 62 and the intensity value of, for example, the upper left pixel with respect to the central pixel is 125. (The intensity values can be relative to represent relative light intensities as will be understood by those skilled in the arts. As shown in FIG. 4B, in applying the census transform to the neighboring pixels with respect to the central pixel, the census transform 330 is configured to generate census digits for the neighboring pixels utilizing the census transform d (P,P') of Equation 1. For example, the census transform 330 compares the intensity value 62 of the central pixel to the intensity value 125 of the upper left pixel (i.e., pixel located at 135° with respect to the center pixel) and determines that P≤P' (e.g., 62≤125). As would be understood by those of ordinary skill in the relevant arts, the comparison of neighboring pixels is not limited to the pixels immediately adjacent to the central pixel, and can include the comparison of the pixels within one pixel length (e.g., pixels located next to the immediately adjacent pixels), two pixels lengths, etc. in addition to, or in alternative, to the comparison of immediately adjacent pixels.

Based on this comparison, the census transform 330 determines that the census digit for the upper left pixel (i.e., pixel located at 135° with respect to the center pixel) has a value of "1" by applying equation 1 above, and as illustrated in FIG. 4B. FIG. 4B illustrates the census digits 410 for the pixels neighboring the central pixel. Based on the determined census digits 410, the census transform 330 is configured to determine a signature vector 415 (as illustrated in FIG. 4C) corresponding to the central pixel. In an exemplary embodiment, the optical flow logic 335 can be configured to generate optical flow information corresponding to the video image data captured by the image sensor 305. In operation, the optical flow logic 335 generates optical flow information based on the signature vector(s) 415 determined by the census transform 330.

In an exemplary embodiment, the census transform 330 is configured to generate the signature vector 415 by comparing each of the neighboring pixels with the central pixel using the census transform d (P,P') in a clockwise direction as illustrated by the arrow in FIG. 4B, starting with the upper left pixel with respect to the central pixel. For example, the census transform 330 compares the intensity value of the central pixel to the intensity value of the various neighboring pixels in the following order: upper left pixel) (135°, upper center pixel (90°), upper right pixel (45°), right center pixel (0°), lower right pixel (315°), lower center pixel (270°), lower left pixel (225°), and center left pixel (180°), The signature vector 415 in FIG. 4C is formulated from the collection of census digits 410 following the arrow clockwise around the central pixel P, and is indicated as "11001111" in FIG. 4C for the census digits of FIG. 4B.

The direction and/or order of the comparisons is not limited to the clockwise direction and starting pixel described above, and the direction, order, and/or starting pixel can be modified as would be understood by one of ordinary skill in the relevant arts without departing from the spirit and scope of the present disclosure. Further, the pixel intensity values are not limited to the example pixel values illustrated in FIGS. 4A-4C, and the pixel intensity values can be one or more other pixel intensity values as would be understood by those of ordinary skill in the relevant arts.

FIGS. 5A-5C illustrate example pixel intensity values 505, example census digits 510, an exemplary signature vector 515, and an exemplary operation of the census transform 330 according to an exemplary embodiment of the present disclosure.

In an exemplary embodiment, the census transform 300 can utilize the census transform d (P,P') that satisfies Equation 2 provided below:

$$d(P, P') = \begin{cases} 0 \text{ if } P - P' > \beta \\ 1 \text{ if } |P - P'| \leq \beta \\ 2 \text{ if } P' - P > \beta \end{cases} \quad \text{Equation 2}$$

where P is the central pixel intensity value, P' is the pixel intensity value of a neighboring pixel, and β is a threshold value. In an exemplary embodiment, the threshold value β is, for example, 16. The threshold value β can be a predetermined threshold value, or the processor circuitry 310 can be configured to determine the threshold value based on an analysis of the video image data provided by the sensor 305. The threshold value β is not limited to the example value of 16, and can be any value as would be understood by one of ordinary skill in the relevant arts without departing from the spirit and scope of the present disclosure.

As illustrated in FIG. 5A, the intensity value P of the central pixel is, for example, 62 and the intensity value of, for example, the upper left pixel with respect to the central pixel is, for example, 125. As shown in FIG. 5B, in applying the census transform to the neighboring pixels with respect to the central pixel using Equation 2 (β=16), the census transform 330 is configured to generate census digits for the neighboring pixels utilizing the census transform d (P,P'). For example, the census transform 330 compares the intensity value 62 of the central pixel to the intensity value 125 of the upper left pixel (i.e., pixel located at 135° with respect to the center pixel) and determines that P'−P>β, when β=16 (e.g., 125−62=63, which is greater than 16). Based on this comparison, the census transform 330 determines that the census digit for the upper left pixel (i.e., pixel located at 135°) has a value of "2" as illustrated in FIG. 5B. FIG. 5B illustrates the census digits 510 for the pixels neighboring the central pixel. Based on the determined census digits 510, the census transform 330 is configured to determine a signature vector 515 (as illustrated in FIG. 5C) corresponding to the central pixel. The signature vector 515 in FIG. 5C is formulated from the collection of census digits 510 following the arrow clockwise around the central pixel P, and is indicated as "21002221" in FIG. 5C for the census digits of FIG. 5B. In an exemplary embodiment, the optical flow logic 335 can be configured to generate optical flow information corresponding to the video image data captured by the image sensor 305 based on the signature vector(s) 515 determined by the census transform 330.

In an exemplary embodiment, the census transform 330 is configured to generate the signature vector 515 by comparing each of the neighboring pixels with the central pixel using the census transform d (P,P') in, for example, a clockwise direction starting with the upper left pixel with respect to the central pixel.

FIGS. 5D-5F illustrate example pixel intensity values 525, example census digits 530, and an exemplary signature vector 535 according to an exemplary embodiment of the present disclosure. The pixel intensity values 525, the census digits 530, and the signature vector 535 are similar to the pixel intensity values 505, the census digits 510, and the signature vector 515, respectively. However, the pixel intensity values 525 for the central pixel and the neighboring pixels represent the pixel intensity values of the video image data following compression and decompression of the video image data. In this example, FIG. 5D illustrates that the pixel intensity values for decompressed video image data (e.g., video data resulting from a decompressed video image bitstream) may differ with respect to the pixel intensity values for uncompressed video image data (e.g., pixel intensity values illustrated in FIG. 5A). Therefore, the corresponding census digits 530 and the resulting signature vector 535 may also differ as illustrated in FIGS. 5E and 5F.

As will be understood by one of ordinary skill in the relevant arts, the pixel intensity values, census digit values, and/or corresponding signature vectors resulting from decompressed video image data may vary from the corresponding pixel intensity values, census digit values, and/or corresponding signature vectors resulting from uncompressed video image data due to, for example, quantization errors associated with one or more compression processes and/or algorithms. As an example, the upper left pixel 550 has changed from a value of "125" in FIG. 5A to a value of "123" in FIG. 5D, when going from uncompressed to decompressed. Other differences between pixels intensity values 505 and 525 can also be seen.

Figure 6:
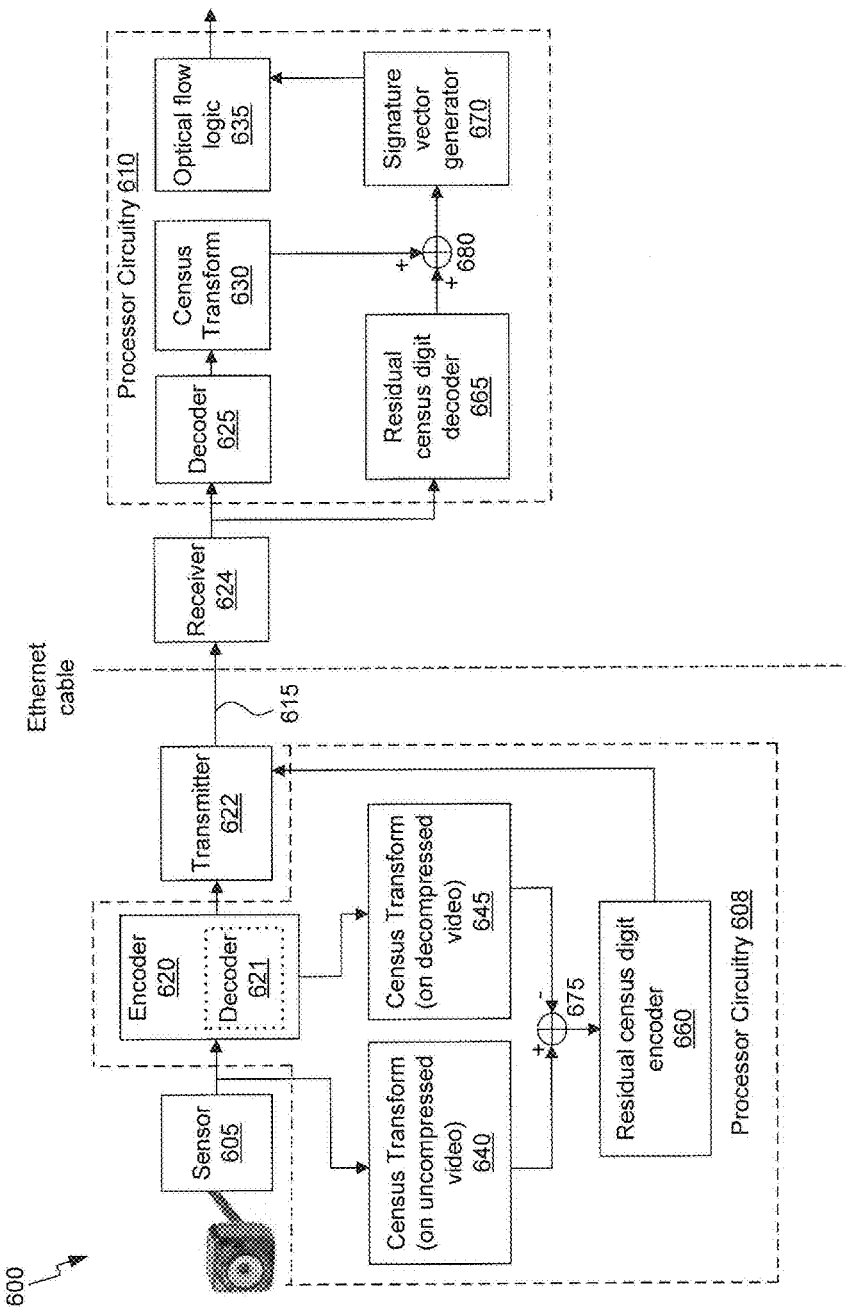
FIG. 6 illustrates a data processing system according to an exemplary embodiment of the present disclosure.

FIG. 6 illustrates a data processing system 600 according to an exemplary embodiment of the present disclosure. The data processing system 600 is similar to the data processing system 200 as illustrated in FIG. 2 and the data processing system 300 as illustrated in FIG. 3, and includes one or more sensors 605, processor circuitry 608 (that can include an encoder 620, a census transform 640, a census transform 645, and a residual census digit encoder 660), a transmitter 622, receiver 624, and processor circuitry 610 (that can include a decoder 625, census transform 630, optical flow logic 635, residual census digit decoder 665, and signature vector 670). The sensor(s) 605, the transmitter 622, the encoder 620, the receiver 624, and the decoder 625 can be similar to sensor(s) 305/205, transmitter 222/322, receiver 224/324, encoder(s) 320/220, and decoder(s) 325/225 of FIGS. 2 and 3, and discussion of similar functionality and/or configurations may have been omitted for brevity.

In an exemplary embodiment, the processor circuitry 608 includes census transform 640, census transform 645, and/or residual census digit encoder 660, and the processor circuitry 610 includes residual census digit decoder 665, signature vector processor 670, and optical flow logic 670. The census transform 640, the census transform 645, and/or the census transform 630 can be similar to the census transform 330 as illustrated in FIG. 3, and discussion of similar functionality and/or configurations may have been omitted for brevity.

The processor circuitry 610 is an exemplary embodiment of the processor circuitry 310 and/or 210 illustrated in FIGS. 2 and 3, respectively. In an exemplary embodiment, the processor circuitry 610 includes census transform 630 and optical flow logic 635. The census transform 630 and the optical flow processor 635 can be similar to the census transform 330 and optical flow logic 335 as illustrated in FIG. 3, respectively, and discussion of similar functionality and/or configurations may have been omitted for brevity.

The processor circuitry 610 can include one or more processors (CPUs) and/or circuits configured to process video image bitstreams and/or one or more residual bitstreams received by the receiver 624 from the transmitter 622 and/or to carry out instructions to perform arithmetical, logical, and/or input/output (I/O) operations of the data processing system 600. In an exemplary embodiment, the processor circuitry 610 is configured to process image data and/or one or more residual census digit planes, and to determine intensity values for one or more pixels of the image data. Using the census transform 630, the optical flow logic 635, the residual census digit decoder 665, and/or signature vector generator 670, the processor circuitry 610 can be configured to perform census transformations and/or optical flow computations on the image data as explained in detail below.

The census transform 640 of the processor circuitry 608 includes one or more processors, circuitry, logic and/or code that are configured to perform one or more image processing operations utilizing a census transform to generate one or more census digit planes. In an exemplary embodiment, the census transform 640 is configured to perform one or more image processing operations utilizing a census transform (e.g., census transform d (P,P') that satisfies Equation 2) on video image data generated by the image sensor 605 (e.g., on uncompressed video image data from the sensor 605). In an exemplary embodiment, the video image data generated by the image sensor 605 is uncompressed video image data and the census transform 640 is configured to generate one or more census digit planes based on the uncompressed video image data.

A census digit plane is set of one or more census digits corresponding to one or more pixels of an image. In an exemplary embodiment, the census transform 640 is configured to generate, for example, four census digit planes—census digit plane a, census digit plane b, census digit plane c, and census digit plane h. As discussed in detail below, and with reference to FIGS. 7-9D, the census digit plane a comprises one or more census digits resulting from one or more census transforms that compare a pixel intensity value of a selected pixel to the pixel intensity value of a first location of a neighboring pixel, for example the upper left neighboring pixel (e.g., pixel located at 135° with respect to the selected pixel). The census digit plane b comprises one or more census digits resulting from one or more census transforms that compare a pixel intensity value of the selected pixel to the pixel intensity value of a second location of a neighboring pixel, for example the upper center neighboring pixel (e.g., pixel located at 90° with respect to the selected pixel). The census digit plane c comprises one or more census digits resulting from one or more census transforms that compare a pixel intensity value of the selected pixel to the pixel intensity value of a third location of a neighboring pixel, for example the upper right neighboring pixel (e.g., pixel located at 45° with respect to the selected pixel). The census digit plane h comprises one or more census digits resulting from one or more census transforms that compare a pixel intensity value of the selected pixel to a fourth location of a neighboring pixel, for example the pixel intensity value of the center left neighboring pixel (e.g., pixel located at 180° with respect to the selected pixel). For boundary pixels of an image (i.e., pixels whose neighboring pixels would fall outside the image boundary), the corresponding census digit values can be set to a value of, for example, 1. The census digits for boundary pixels are not limited to being set to the value of 1, and the census digits for boundary pixels can be set as other census digit values as would be understood by one of ordinary skill in the relevant art(s).

Figure 7:
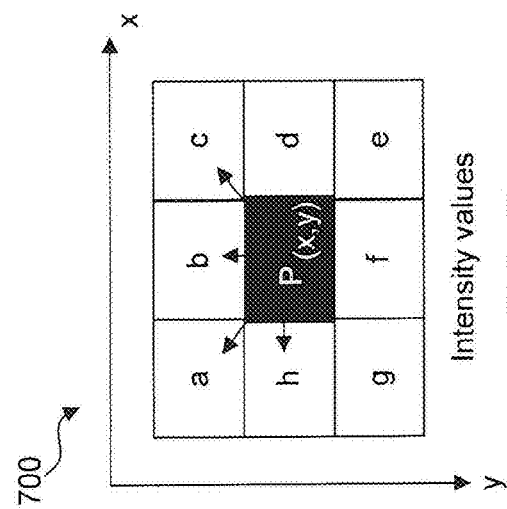
FIG. 7 illustrates a coordinate system according to an exemplary embodiment of the present disclosure.

In an exemplary embodiment, the census transform 640 can generate census digit planes a, b, c, and h according to the Equation 3 provided below:

$$C(x, y) = \begin{cases} \text{plane } a \to d(P(x, y), a) \\ \text{plane } b \to d(P(x, y), b) \\ \text{plane } c \to d(P(x, y), c) \\ \text{plane } h \to d(P(x, y), h) \end{cases} \quad \text{Equation 3}$$

where x=(0:picWidth−1), y=(0: picHeight−1), and picWidth×picHeight=total image size in pixels. FIG. 7 illustrates an exemplary coordinate system 700 according to an exemplary embodiment. For example, FIG. 7 illustrates an active pixel P and neighboring pixels a thought h within the x y coordinate system 700, where the census digit planes a, b, c, and h are further described in FIGS. 8, 9A-9D.

In creating the census digit plane a ($C^a(x,y)$), the census transform 640 is configured to select a pixel from the video image data received from the sensor 605, which can be referred to as an "active pixel," and to compare the pixel intensity of the active pixel with the pixel intensity value of one or more neighboring pixels. In an exemplary embodiment, the census transform 640 can compare the active pixel to a neighboring pixel located at, for example, 135° with respect to the active pixel. The census transform 640 can select a new active pixel and compare the new active pixel to the neighboring pixel located at a relative location, for example, 135° with respect to the new active pixel. That is, the census transform 640 can repeat the selection and comparison procedure to generate the census digit plane a for two or more active pixels making up an image. In an exemplary embodiment, the census transform 640 can iteratively select and compare each pixel of the video image data, or a subset of pixels of the video image data. For example, and with reference to FIG. 8, which illustrates exemplary pixel intensity values of video image data, the census transform 640 can compare the pixel intensity value of an active pixel 802 (e.g., P=134) to the pixel intensity value of the neighboring pixel located at a relative location of 135° with respect to the active pixel (e.g., P'=160) using the census transform d (P,P') that satisfies Equation 2. With reference to FIG. 9A, which illustrates an exemplary census digit plane a, the census transform 640 can determine the census digit value of 2 for the active pixel (802 in FIG. 8) as indicated by reference character 902. For example, using Equation 2 (e.g., P'−P>β), the census transform 640 can determine that 160−134=26, which is greater than the threshold 16, resulting in a census digit value of 2 as illustrated by reference character 902 in FIG. 9A. With continued reference to FIG. 9A, in selecting a new active pixel at, for example, the pixel located at reference character 804 (e.g., the pixel having an intensity value of 70), the census transform 640 can determine the next census digit 904 for the active pixel 804 as having a value of 2 (e.g., 134−70=64, which is greater than 16). It is noted that the neighboring pixel (e.g. P'=134) has the same relative location of 135° with respect to the new active pixel (e.g. P'=70), as in the calculation for the prior active pixel (e.g. P'=134). This is repeated for all the active pixels in FIG. 8 to fill out census digit plane a that is shown in FIG. 9A.

In creating the census digit plane b ($C^b(x,y)$), the census transform 640 can perform similar operations as those performed for the generation of the census digit plane a, but the census transform 640 can compare the active pixel to a neighboring pixel located at, for example, a second relative location 90° with respect to the active pixel. For example, and with reference to FIG. 8, the census transform 640 can compare the pixel intensity value of the active pixel 802 (e.g., P=134) to the pixel intensity value of the neighboring pixel located at a second relative location 90° with respect to the active pixel (e.g., P'=148) using the census transform d (P,P') that satisfies Equation 2. With reference to FIG. 9B, which illustrates an exemplary census digit plane h, the census transform 640 can determine the census digit value of 1 for the active pixel (802 in FIG. 8) as indicated by reference character 906. For example, using Equation 2 (e.g., |P−P'|≤β), the census transform 640 can determine that |134−148|=14, which is less than 16, resulting in a census digit value of 1 as illustrated by reference character 906 in FIG. 9B. With continued reference to FIG. 9B, in selecting a new active pixel at, for example, the pixel located at reference character 808 (e.g., the pixel having an intensity value of 75 in FIG. 8), the census transform 640 can determine the next census digit 908 for the active pixel 808 as having a value of 2 (e.g., 134−75=59, which is greater than 16). It is noted that the neighboring pixel (e.g. P'=134) has the same relative location of 90° with respect to the new active pixel (e.g. P'=75), as in the calculation for the prior active pixel (e.g. P'=134). This is repeated for all the active pixels in FIG. 8 to fill out census digit plane b that is shown in FIG. 9B.

In creating the census digit plane c ($C^c(x,y)$), the census transform 640 can perform similar operations as those performed for the generation of the census digit planes a and b, but the census transform 640 can compare the active pixel to a neighboring pixel located at a third relative location, for example, 45° with respect to the active pixel. For example, and with reference to FIG. 8, the census transform 640 can compare the pixel intensity value of the active pixel 802 (e.g., P=134) to the pixel intensity value of the neighboring pixel located at a third relative location 45° with respect to the active pixel (e.g., P'=146) using the census transform d (P,P') that satisfies Equation 2. With reference to FIG. 9C, which illustrates an exemplary census digit plane c, the census transform 640 can determine the census digit value of 1 for the active pixel (802 in FIG. 8) as indicated by reference character 910 in FIG. 9C. For example, using Equation 2 (e.g., |P−P'|≤β), the census transform 640 can determine that |134−146|=12, which is less than 16, resulting in a census digit value of 1 as illustrated by reference character 910 in FIG. 9C. With continued reference to FIG. 9C, in selecting a new active pixel at, for example, the pixel located at reference character 812 (e.g., the pixel having an intensity value of 92 in FIG. 8), the census transform 640 can determine the next census digit 912 for the active pixel 812 as having a value of 2 (e.g., 134−92=42, which is greater than 16). It is noted that the neighboring pixel (e.g. P'=134) has the same relative location of 45° with respect to the new active pixel (e.g. P'=92), as in the calculation for the prior active pixel (e.g. P'=134). This is repeated for all the active pixels in FIG. 8 to fill out census digit plane c that is shown in FIG. 9C.

In creating the census digit plane h ($C^h(x,y)$), the census transform 640 can perform similar operations as those performed for the generation of the census digit planes a, b, and c, but the census transform 640 can compare the active pixel to a neighboring pixel located at a fourth relative location, for example, 180° with respect to the active pixel. For example, and with reference to FIG. 8, the census transform 640 can compare the pixel intensity value of the active pixel (e.g., P=134) to the pixel intensity value of the neighboring pixel located at 180° with respect to the active pixel (e.g., P'=149) using the census transform d (P,P') that satisfies Equation 2. With reference to FIG. 9D, which illustrates an exemplary census digit plane h, the census transform 640 can determine the census digit value of 1 for the active pixel (802 in FIG. 8) as indicated by reference character 914. For example, using Equation 2 (e.g., $|P-P'|\leq\beta$), the census transform 640 can determine that $|134-149|=15$, which is less than 16, resulting in a census digit value of 1 as illustrated by reference character 914 in FIG. 9D. With continued reference to FIG. 9D, in selecting a new active pixel at, for example, the pixel located at reference character 816 (e.g., the pixel having an intensity value of 110 in FIG. 8), the census transform 640 can determine the next census digit 916 for the active pixel 816 as having a value of 2 (e.g., $134-110=24$, which is greater than 16). It is noted that the neighboring pixel (e.g. $P'=134$) has the same relative location of 180° with respect to the new active pixel (e.g. $P'=110$), as in the calculation for the prior active pixel (e.g. $P'=134$). This is repeated for all the active pixels in FIG. 8 to fill out census digit plane h that is shown in FIG. 9D.

The census transform 645 is similar to the census transform 640 and includes one or more processors, circuitry, logic and/or code that are configured to perform one or more image processing operations utilizing a census transform to generate one or more census digit planes. In an exemplary embodiment, the census transform 645 is configured to generate, for example, four census digit planes—census digit plane a, census digit plane b, census digit plane c, and census digit plane h using similar operations as those utilized in the generation of the census digit planes by census transform 640. In an exemplary embodiment, the census transform 645 is configured to perform one or more image processing operations utilizing a census transform (e.g., census transform d (P,P') that satisfies Equation 2) on decompressed video image data generated by the encoder 620, which is based on the uncompressed video image data from the image sensor 605. In an exemplary embodiment, the decompressed video image data is the video image data resulting from the decompression of compressed video image data generated by the encoder 620. That is, the encoder 620 is configured to compress the video image data received from the sensor 605 to generate a compressed video image bitstream that is provided to the transmitter 622 for transmission to the receiver 624 via the communication link 615. The encoder 620 is also configured to decompress the compressed video bitstream to generate decompressed video image data, which is provided to the census transform 645.

In an exemplary embodiment, the data processing system 600 includes a subtractor 675 configured to receive two or more input signals and generate one or more output signals based on the two input signals. The subtractor 675 can be configured to perform one or more mathematical operations on the two or more input signals to generate the output signal(s). For example, the subtractor 675 can be configured to determine a difference between the two or more input signals to generate the mixed output signal(s). The subtractor 675 is configured to subtract the output of the census transform 645 from the output of the census transform 640 to generate the output signal. The output signal can be provided as an input to the residual census digit encoder 660. In an exemplary embodiment, the subtractor 675 is configured to subtract the census digits of the census digit planes generated by the census transform 645 from the respective census digits of the census digit planes generated by the census transform 640 to generate corresponding residual census digit planes. For example, subtractor 675 can be configured to subtract the census digits of census digit planes a, b, c, and h generated from the decompressed video image data from encoder 620 (as illustrated in FIG. 10B) from the census digits of census digit planes a, b, c, and h generated from the uncompressed video image data from the sensor 605 (as illustrated in FIG. 10A) to generate corresponding residual census digit planes a, b, c, and h (as illustrated in FIG. 10C). As will be understood by one of ordinary skill in the relevant arts, the census digit values of the various census digit planes are exemplary values and the present disclosure is not limited to these exemplary values. Further, one of ordinary skill in the relevant arts will understand that the census digit values resulting from the decompressed video image data may vary from the corresponding census digit values resulting from the uncompressed video image data due to, for example, quantization errors associated with one or more compression/decompression processes and/or algorithms. In an embodiment, the subtraction operation of subtractor 675 is replaced with another mathematical operation configured to add, multiple, divide, and/or perform one or more other well-known mathematical operations on the input signals to generate the output signal(s).

The residual census digit encoder 660 includes one or more processors, circuitry, logic and/or code that are configured to perform one or more encoding and/or compression operations to convert the residual census plane(s) to one or more residual bitstreams. The encoding and/or compression operations can utilize one or more well-known coding and/or compression algorithms, and/or one or more well-known codecs to encode and/or compress the residual census plane(s). In an exemplary embodiment, the residual census digit encoder 660 can be configured to utilize context adaptive binary arithmetic coding (CABAC) to binarize and/or compress one or more residual census digits to generate one or more residual bitstreams. The residual census digit encoder 660 can be configured to provide the residual bitstream(s) to the transmitter 622, which is configured to transmit the residual bitstream(s) to the receiver 624 via the Ethernet communication link 615. That is, the receiver 624 can be configured to receive the residual bitstream(s) (generated by the residual census digit encoder 660) and the encoded/compressed video image bitstream (generated by the encoder 620).

In an exemplary embodiment, the residual census digit encoder 660 can be configured to divide the residual census plane(s) into two or more blocks, and to binarize and/or compress some or all of the blocks to generate the residual bitstream(s). In operation, the residual census digit encoder 660 can be configured to compare one or more of the blocks to a residual threshold value. Based on this comparison, the residual census digit encoder 660 can determine to what degree the census digit planes differ. For example, if the difference between census digit planes (that are used to generate the residual census planes) is less than the residual threshold value, the residual census digit encoder 660 can be configured to omit one or more of the block(s) from the binarization and/or compression as the residual values indicate that the compression/decompression by the encoder 620 has not resulted in significant differences in the corresponding census digit values. The residual census digit encoder 660 can be configured to signal whether a block is omitted from the binarization and/or compression in the residual bitstream(s).

Table 1 provided below illustrates the binarization of residual census digits according to an exemplary embodiment of a present disclosure. In an exemplary embodiment, zero_flag bins (i.e., bin 0) can be coded as context-coded bins with one or more context models, and sign (i.e., bin 1) and level (i.e., bin 2) bins can be coded as bypass bins.

TABLE 1

Binarization of Residual Census Digits

| Residual value of census digits | Bin 0 (zero-flag) | Bin 1 (sign) | Bin 2 (level) |
|---|---|---|---|
| −2 | 0 | 1 | 1 |
| −1 | 0 | 1 | 0 |
| 0 | 1 | | |
| 1 | 0 | 0 | 0 |
| 2 | 0 | 0 | 1 |

The encoder 620 can include one or more processors, circuitry, and/or logic that are configured to performing one or more encoding and/or compression operations on video image data from the sensor 605 to generate a compressed video image bitstream. The encoder 620 can be configured to perform lossless or lossy compression on the video image data through one or more of the encoding operations. The encoding operations can utilize one or more well-known codecs and/or compression algorithms to encode and/or compress the video image data. In an exemplary embodiment, the encoder 620 can include a decoder 621 having one or more processors, circuitry, and/or logic that are configured to perform one or more decoding and/or decompression operations in addition to the encoding and/or compression operations. For example, the decoder 621 can be configured perform inverse operations to the encoding/compression operations to generate decompressed video image data. In this example, the decompressed video image data represents video image data that has been compressed by the encoder 620 and then subsequently decompressed by the decoder 621. That is, the decompressed video image data is the data resulting from the decompression of the compressed video image bitstream.

In operation, the encoder 620 can be configured to receive uncompressed video data from the image sensor 605 and perform one or more encoding and/or compression operations on the video image data to generate encoded/compressed video data. The encoder 620 can be configured to provide the compressed video image bitstream to the transmitter 622, which is configured to transmit the compressed video image bitstream to the receiver 624 via the Ethernet communication link 615. The decoder 621 of the encoder 620 can be configured to decompress the compressed video image bitstream to generate decompressed video image data. The encoder 620 (and/or decoder 621) can be configured to provide the decompressed video image data to the census transform 645 for further processing as discussed below.

Decoder 625 can include one or more processors, circuitry, and/or logic that are configured to perform one or more decoding and/or decompression operations on compressed video image bitstream to generate decompressed video image data. In an exemplary embodiment, the decoder 625 can be configured perform inverse operations to the encoding/compression operations performed by the encoder 620. For example, the decoder 625 can generate decompressed video image data based on the compressed video image bitstream received by the receiver 624 from the transmitter 622 via the Ethernet communication link 615. The decoder 625 can be configured to perform lossless or lossy decompression of data through one or more of the decoding and/or decompression operations. The decoding operations can utilize one or more well-known codecs and/or decompression algorithms to decode and/or decompress data. In an exemplary embodiment, the decompressed video image data generated by the decoder 625 can correspond to the decompressed video image data generated by the decoder 621 along with one or more possible losses resulting from the transmission of the data via the Ethernet communication link 615.

In operation, the decoder 625 can be configured to receive the compressed video image bitstream from the receiver 624, and perform one or more decoding and/or decompression operations on the compressed video image bitstream to generate decompressed video image data. The decompressed video image data can represent a decompressed version of the compressed video image bitstream generated by the encoder 620. Further, the decompressed video image data can represent a lossy or lossless version of uncompressed video image data provided to the video encoder 620 by the sensor 605. The decoder 625 can be configured to transmit the decompressed video image data to the census transform 630 for further processing as described in detail below.

The census transform 630 of the processor circuitry 610 can be similar to the census transform 330, the census transform 640 and/or the census transform 645, and discussion of similar functionality and/or configurations may have been omitted for brevity.

The census transform 630 includes one or more processors, circuitry, logic and/or code that are configured to perform one or more image processing operations utilizing a census transform to generate one or more census digit planes. In an exemplary embodiment, the census transform 630 is configured to perform one or more image processing operations utilizing a census transform (e.g., census transform d (P,P') that satisfies Equation 2) on decompressed video image data generated by the decoder 625. In an exemplary embodiment, the decoded video image data generated by the decoder 625 has been decompressed and the census transform 630 is configured to generate one or more census digit planes based on the decompressed video image data. In operation, the census transform 630 performs one or more census transformations on the decompressed video image data to generate one or more census digit planes. In an exemplary embodiment, the census transform 630 can be configured to provide the generated census digit plane(s) to an adder 680 as discussed in detail below.

In an exemplary embodiment, the census transform 630 is configured to generate, for example, four census digit planes—census digit plane a, census digit plane b, census digit plane c, and census digit plane h. In an exemplary embodiment, one or more of the census digit planes are similar to one or more of the census digit planes generated by the census transform 640 and/or the census transform 645. For example, the census digit plane a, the census digit plane h, the census digit plane c, and the census digit plane h generated by the census transform 630 can correspond to the census digit plane a, the census digit plane b, the census digit plane c, and the census digit plane h generated by the census transform 640 and/or the census transform 645, respectively. In this example, the census digit plane a comprises one or more census digits resulting from one or more census transforms that compare a pixel intensity value of selected pixel to the pixel intensity value of the upper left neighboring pixel (e.g., pixel located at 135° with respect to the selected pixel). The census digit plane b comprises one or more census digits resulting from one or more census transforms that compare a pixel intensity value of selected pixel to the pixel intensity value of the upper center neighboring pixel (e.g., pixel located at 90° with respect to the selected pixel). The census digit plane c comprises one or more census digits resulting from one or more census transforms that compare a pixel intensity value of selected pixel to the pixel intensity value of the upper right neighboring pixel (e.g., pixel located at 45° with respect to the selected pixel). The census digit plane h comprises one or more census digits resulting from one or more census transforms that compare a pixel intensity value of selected pixel to the pixel intensity value of the center left neighboring pixel (e.g., pixel located at 180° with respect to the selected pixel). For boundary pixels of an image (i.e., pixels whose neighboring pixels would fall outside the image boundary), the corresponding census digit values can be set to a value of, for example, 1. The census digits for boundary pixels are not limited to being set to the value of 1, and the census digits for boundary pixels can be set as other census digit values as would be understood by one of ordinary skill in the relevant art(s).

The residual census digit decoder 665 includes one or more processors, circuitry, logic and/or code that are configured to perform one or more decoding and/or decompression operations to convert one or more residual bitstreams to one or more the residual census plane(s). In an exemplary embodiment, the residual census digit decoder 665 is similar to the residual census digit encoder 660 and can be configured to perform inverse operations to those operations performed by the residual census digit encoder 660. In this example, the residual census digit decoder 665 is configured to reconstruct (or substantially reconstruct) the residual census plane(s) generated by the subtractor 675 based on the residual bitstream(s) generated by the residual census digit encoder 660 and received by the receiver 624.

The decoding and/or decompression operations can utilize one or more well-known decoding and/or decompression algorithms, and/or one or more well-known codecs to decode and/or decompress the residual bitstream(s) to generate the residual census plane(s). In an exemplary embodiment, the residual census digit decoder 665 can be configured to utilize context adaptive binary arithmetic coding (CABAC) to decompress and/or debinarize one or more residual bitstreams to generate one or more residual census digits and/or corresponding residual census plane(s). In an exemplary embodiment, the residual census digit decoder 665 can be configured to decompress and/or debinarize one or more residual bitstreams based on the binarization of residual census digits as illustrated in Table 1. The residual census digit decoder 665 can be further configured to transmit the residual census plane(s) to adder 680.

Adder 680 is configured to receive two or more input signals and generate one or more output signals based on the input signals. The adder 680 can be configured to perform one or more mathematical operations on the two or more input signals to generate the mixed output signal(s). For example, the adder 680 can be configured to add two or more input signals to generate the output signal(s). In an embodiment, the addition operation of the adder 680 is replaced with another mathematical operation configured to subtract, multiple, divide, and/or perform one or more other well-known mathematical operations on the input signals to generate the mixed output signal(s).

In an exemplary embodiment, the adder 680 is configured to add the output of the census transform 630 and the output of the residual census digit decoder 665, and generate an output signal. The output signal can be provided as an input to the signature vector processor 670. In an exemplary embodiment, the adder 680 is configured to add one or more residual census planes generated by the residual census digit decoder 665 to one or more census digit planes generated by the census transform 630 (e.g., census digit planes generated from previously encoded/compressed video image data having been decoded/decompressed by the decoder 625) to generate one or more census digit planes.

For example, adder 680 can be configured to add the residual census digits of residual census digit planes a, b, c, and h (similar to those illustrated in FIG. 10C) to the census digits of census digit planes a, b, c, and h generated by the census transform 630 (similar to those illustrated in FIG. 10B) based on the decompressed video image data (that has been decompressed and/or decoded by the decoder 625) to reconstruct the census digit planes a, b, c, and h as illustrated in FIG. 10A. In this example, the reconstructed census digit planes a, h, c, and h correspond (or substantially correspond) to the census digit planes a, b, c, and h generated by the census transform 640 based on the video image data (e.g., uncompressed video image data) provided by the sensor 605. That is, the reconstructed census digit planes a, b, c, and h include census digits that correspond to pixel intensity values having increased image quality with respect to one or more census digit planes having been generated from decompressed video image data (e.g., census digit planes generated by, for example, census transform 645 and/or census transform 630). In this example, the reconstructed census digit planes a, b, c, and h have reduced and/or eliminated quantization errors associated with one or more compression processes and/or algorithms.

Signature vector processor 670 includes one or more processors, circuitry, logic and/or code that are configured to generate one or more signature vectors based on one or more census digit planes. In an exemplary embodiment, the signature vector processor 670 can be configured to generate a signature vector based on the reconstructed census digit planes a, b, c, and h generated by the adder 680. The generation of the signature vector is discussed in detail below.

In an exemplary embodiment, the optical flow processor 635 can be configured to receive one or more signature vectors from the signature vector processor 670 and to generate optical flow information corresponding to the video image data captured by the image sensor 605 based on the signature vector(s).

Figure 11A:
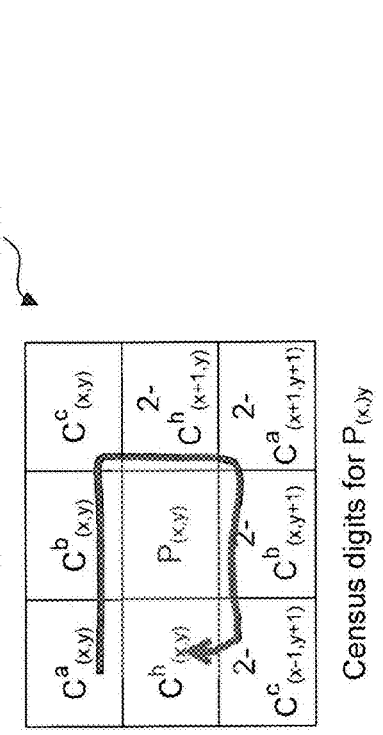
FIG. 11A illustrates an example arrangement of neighboring census digits according to exemplary embodiments of the present disclosure.

FIG. 11A illustrates an example arrangement 1100 of neighboring census digits for the selected pixel P (x,y) that are determined based on the reconstructed census digit planes a, b, c, and h. In this example, the selected pixel P (x,y) is within the exemplary coordinate system as illustrated in FIG. 7.

As illustrated in FIG. 11A, arrangement 1100 of neighboring census digits can be constructed, for example, as follows: the census digit of the upper left pixel (135°) with respect to the selected pixel P(x,y) is determined from the census digit for the corresponding pixel $C^a$(x,y) of the census digit plane a; the census digit of the upper center pixel (90°) with respect to the selected pixel P(x,y) is determined from the census digit for the corresponding pixel $C^b$(x,y) of the census digit plane b; the census digit of the upper right pixel (45°) with respect to the selected pixel P(x,y) is determined from the census digit for the corresponding pixel $C^c$(x,y) of the census digit plane c; the census digit of the right center pixel (0°) with respect to the selected pixel P(x,y) is determined from the difference of a census digit of 2 and the census digit for the pixel $C^h$(x+1,y) of the census digit plane h; the census digit of the lower right pixel (315°) with respect to the selected pixel P(x,y) is determined from the difference of a census digit of 2 and the census digit for the pixel $C^a$(x+1,y+1) of the census digit plane a; the census digit of the lower center pixel (270°) with respect to the selected pixel P(x,y) is determined from the difference of a census digit of 2 and the census digit for the pixel $C^b(x,y+1)$ of the census digit plane b; the census digit of the lower left pixel (225°) with respect to the selected pixel P(x,y) is determined from the difference of a census digit of 2 and the census digit for the pixel $C^c(x-1,y+1)$ of the census digit plane c; and the census digit of the center left pixel (180°) with respect to the selected pixel P(x,y) is determined from the census digit for the corresponding pixel $C^h(x,y)$ of the census digit plane h.

Figure 11B:
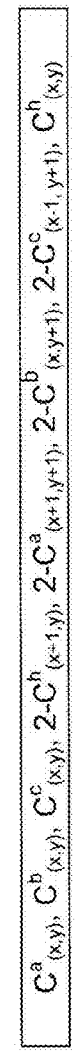
FIG. 11B illustrates an example signature vector according to exemplary embodiments of the present disclosure.

In an exemplary embodiment, and with reference to FIG. 11B, the signature vector processor 670 can be configured to generate the arrangement 1100 as illustrated in FIG. 11A and can generate a signature vector 1105 by selecting the neighboring census digits of the arrangement in a clockwise direction starting with the upper left pixel (135°) with respect to the pixel P(x,y). In this example, the signature vector processor 670 generates the signature vector 1105 such that the arrangement of the digits of the signature vector 1105 satisfies Equation 4 provided below:

$$\text{Signature Vector of } P(x,y) = C^a(x,y), C^b(x,y), C^c(x,y), 2-C^h(x+1,y), 2-C^a(x+1,y+1), 2-C^b(x,y+1), 2-C^c(x-1,y+1), C^h(x,y) \quad \text{Equation 4}$$

With reference to FIGS. 8 and (9A-9E), in applying Equation 4 to the census digit planes a, b, c, and h shown in FIGS. 9A-9D, the signature vector 950 illustrated in FIG. 9E can be generated by, for example, signature vector processor 670. In operation, the signature vector processor 670 generates the signature vector based on census digit planes a, b, c, and h shown in, for example, FIGS. 9A-9D. To determine a signature vector for a pixel, the signature vector processor 670 can select, for example, pixel 802 (FIG. 8) within the video image data as the selected pixel P(x,y). The signature vector processor 670 can then select census digits from the census digit planes a, b, c, and h based on Equation 4. For example, as the first digit in the signature vector, the signature vector processor 670 can select the census digit from census digit planes a at the corresponding position $C^a(x,y)$ with respect to the position of the selected pixel P(x,y) within the image data. That is, if the pixel 802 is located at a position having the coordinates (x, y) within the coordinate system illustrated in FIG. 7, the signature vector processor 670 can select the census digit (e.g., 902 in FIG. 9A) from census digit plane a at the same position (x,y) within the census digit plane a.

For the second digit of the signature vector, the signature vector processor 670 can select the census digit from census digit planes b at the corresponding position $C^b(x,y)$ with respect to the position of the selected pixel P(x,y) within the image data. That is, the signature vector processor 670 can select the census digit (e.g., 906 in FIG. 9B) from census digit plane b at the same position (x,y) within the census digit plane b.

For the third digit of the signature vector, the signature vector processor 670 can select the census digit from census digit planes c at the corresponding position $C^c(x,y)$ with respect to the position of the selected pixel P(x,y) within the image data. That is, the signature vector processor 670 can select the census digit (e.g., 910 in FIG. 9C) from census digit plane c at the same position (x,y) within the census digit plane c.

For the fourth digit of the signature vector, the signature vector processor 670 can select the census digit from census digit planes h at the position $C^h(x+1,y)$ with respect to the position of the selected pixel P(x,y) within the image data. That is, the signature vector processor 670 can select the census digit (e.g., 916 in FIG. 9D) from census digit plane h at the position (x+1,y) within the census digit plane h.

For the fifth digit of the signature vector, the signature vector processor 670 can select the census digit from census digit planes a at the position $C^a(x+1,y)$ with respect to the position of the selected pixel P(x,y) within the image data. That is, the signature vector processor 670 can select the census digit (e.g., 904 in FIG. 9A) from census digit plane a at the position (x+1,y+1) within the census digit plane a.

For the sixth digit of the signature vector, the signature vector processor 670 can select the census digit from census digit planes b at the position $C^b(x,y+1)$ with respect to the position of the selected pixel P(x,y) within the image data. That is, the signature vector processor 670 can select the census digit (e.g., 908 in FIG. 9B) from census digit plane b at the position (x,y+1) within the census digit plane b.

For the seventh digit of the signature vector, the signature vector processor 670 can select the census digit from census digit planes c at the position $C^c(x-1,y+1)$ with respect to the position of the selected pixel P(x,y) within the image data. That is, the signature vector processor 670 can select the census digit (e.g., 912 in FIG. 9C) from census digit plane c at the position (x-1,y+1) within the census digit plane c.

For the eighth digit of the signature vector, the signature vector processor 670 can select the census digit from census digit planes h at the corresponding position $C^h(x,y)$ with respect to the position of the selected pixel P(x,y) within the image data. That is, the signature vector processor 670 can select the census digit (e.g., 914 in FIG. 9D) from census digit plane h at the same position (x,y) within the census digit plane h.

Based on these selections that satisfy Equation 4, the signature vector processor 670 can generate a signature vector "21100001" (as illustrated in FIG. 9E) that corresponds to the pixel (located at 802 in FIG. 8) having the pixel intensity value of, for example, 134.

Figure 12:
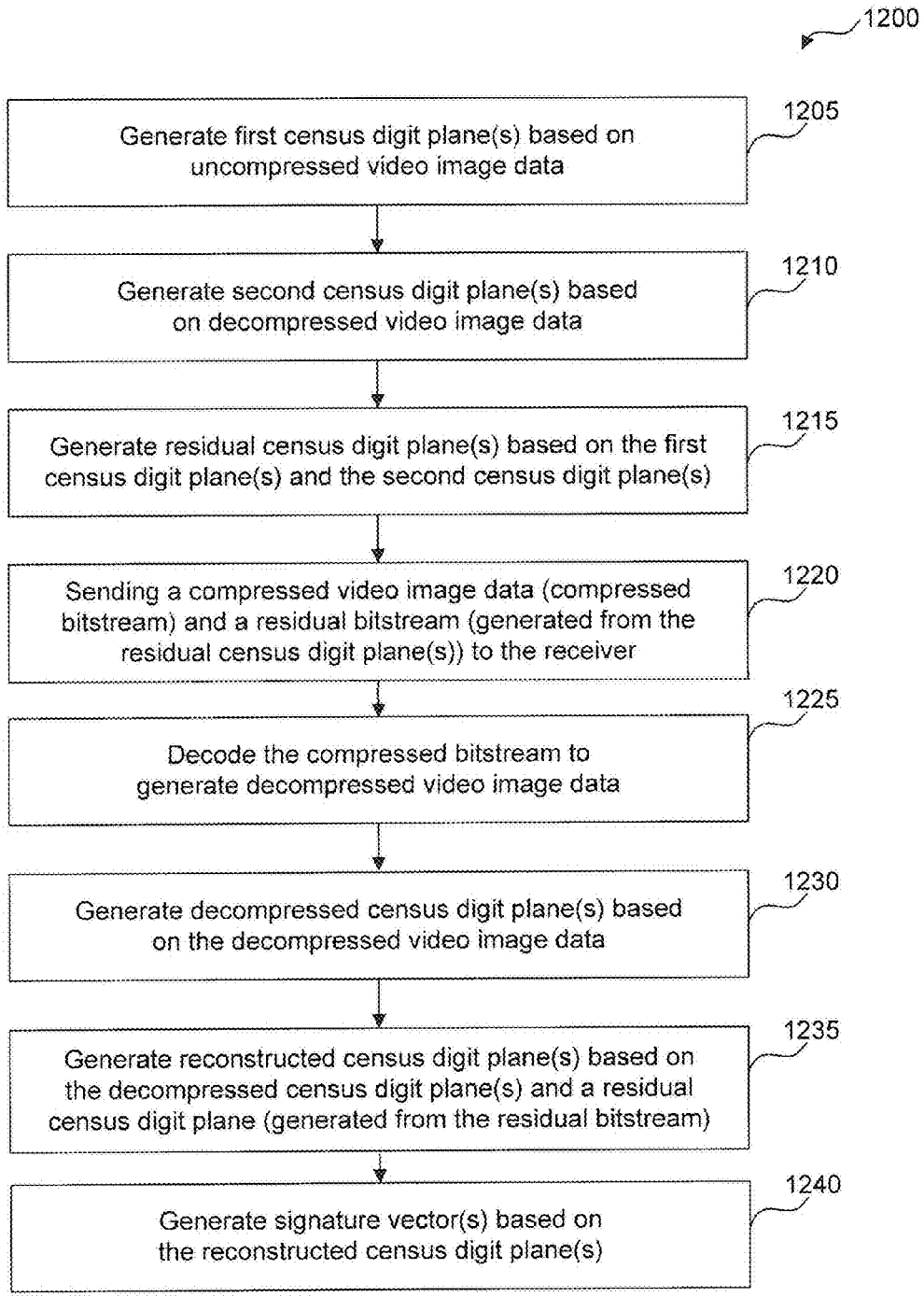
FIG. 12 illustrates a flowchart of an image processing method according to an exemplary embodiment of the present disclosure.

FIG. 12 illustrates a flowchart 1200 of a video image processing method according to an exemplary embodiment of the present disclosure. The method of flowchart 1200 is described with continued reference to one or more of FIGS. 1-11B. The steps of the method of flowchart 1200 are not limited to the order described below, and the various steps may be performed in a different order. Further, two or more steps of the method of flowchart 1200 may be performed simultaneously with each other.

The method of flowchart 1200 begins at step 1205, where the census transform 640 performs one or more census transforms on video image data (e.g., uncompressed video image data) received from the sensor 605 to generate one or more census digit planes. For example, the census transform 640 can be configured to perform a census transformation that satisfies Equation 2.

After step 1205, the method of flowchart 1200 transitions to step 1210, where the census transform 645 performs one or more census transforms on decompressed video image data received from the encoder 620 to generate one or more decompressed census digit planes. For example, the census transform 645 can be configured to perform a census transformation that satisfies Equation 2.

After step 1210, the method of flowchart 1200 transitions to step 1215, where the subtractor 675 generates one or more residual census digit planes based on the census digit plane(s) generated based on the decompressed video image data and the census digit plane(s) generated based on the uncompressed video image data from the sensor 605. For example, the subtractor 675 can subtract the census digits of the census digit planes generated based on the decompressed video image data from corresponding census digits of the census digit planes generated based on the uncompressed video image data to generate the residual census digit planes. One or more residual bitstreams can be generated by, for example, the residual census digit encoder 660, based on the residual census digit planes.

After step 1215, the method of flowchart 1200 transitions to step 1220, the compressed video image bitstream (i.e., encoded/compressed video image data from the encoder 620) and/or the residual bitstreams (from the residual census digit encoder 660) are transmitted to the receiver 624. For example, the transmitter 622 can be configured to transmit the compressed video image bitstream and/or the residual bitstreams to the receiver 624, which can be configured to provide the compressed video image bitstream to the decoder 625 (and the residual bitstreams to the residual census digit decoder 665. In an exemplary embodiment, the compressed video image bitstream and/or the residual bitstreams are transmitted to the receiver 624 via the Ethernet communication link 615.

After step 1220, the method of flowchart 1200 transitions to step 1225, where the decoder 625 can decode compressed video image bitstream (received by the receiver 624 from the transmitter 622) to generate decompressed video image data.

After step 1225, the method of flowchart 1200 transitions to step 1230, where the census transform 630 performs one or more census transforms on the decompressed video image data (from the census transform 630) to generate one or more decompressed census digit planes (i.e., census planes generated based on decompressed video image data from the decoder 625). For example, the census transform 630 can be configured to perform a census transformation that satisfies Equation 2. The residual census digit decoder can reconstruct one or more residual census digit plane(s) based on the residual bitstreams received from the receiver 624.

After step 1230, the method of flowchart 1200 transitions to step 1235, where the adder 680 generates one or more reconstructed census digit planes based on the decompressed census digit plane(s) and the reconstructed residual census digit plane(s) (i.e., census planes generated by the residual census digit decoder 665 based on the residual bitsream(s)). For example, the adder 680 can add the census digits of the decompressed census digit planes with corresponding census digits of the reconstructed residual census digit planes to generate the reconstructed census digit planes.

After step 1235, the method of flowchart 1200 transitions to step 1240, where the signature vector processor 670 generates one or more signature vectors based on the reconstructed census digit planes. For example, the signature vector processor 670 can be configured to generate one or more signature vectors based on the reconstructed census digit planes utilizing Equation 4.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, computer instructions, or any combination thereof. Embodiments may also be implemented as instructions stored on a machine-readable medium, which may be read and executed by one or more processors. A machine-readable medium may include any hardware mechanism for storing or transmitting information in a form readable by a machine (e.g., a computing device). For example, a machine-readable medium may include read only memory (ROM); random access memory (RAM); magnetic disk storage media; optical storage media; flash memory devices. Further, instructions may be described herein as performing certain actions. However, it should be appreciated that such descriptions are merely for convenience and that such actions in fact results from computing devices, processors, controllers, or other devices executing the instructions.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A video image processing device, comprising:
a transmitter configured to transmit a residual bitstream via a communication link; and
processor circuitry communicatively coupled to the transmitter, the processor circuitry including:
an encoder, including a decoder, configured to:
receive uncompressed video image data from an image sensor and compress the uncompressed video image data to generate compressed video image data; and
decompress, by the decoder, the compressed video image data to generate decompressed video image data;
a first census transform configured to generate one or more uncompressed census digit planes based on the uncompressed video image data;
a second census transform configured to generate one or more decompressed census digit planes based on the decompressed video image data, wherein the decompressed video image data was previously compressed by the encoder;
a subtractor configured to receive the one or more uncompressed census digit planes and the one or more decompressed census digit planes, and to generate one or more residual census digit planes based on the one or more uncompressed census digit planes and the one or more decompressed census digit planes; and
a residual census digit generator configured to generate the residual bitstream based on the one or more residual census digit planes.

2. The video image processing device of claim 1, wherein the residual census digit generator is configured to generate the residual bitstream based on a difference of a census digit of the one or more uncompressed census digit planes and a corresponding census digit of the one or more decompressed census digit planes.

3. The video image processing device of claim 1, wherein the subtractor is configured to:
subtract a census digit of the one or more decompressed census digit planes from a corresponding census digit of the one or more uncompressed census digit planes to generate the one or more residual census digit planes.

4. The video image processing device of claim 1, wherein the transmitter is further configured to transmit the compressed video image data via the communication link.

5. The video image processing device of claim 1, wherein the transmitter is configured to transmit the residual bitstream utilizing an Ethernet protocol.

6. The video image processing device of claim 1, wherein the communication link is an Ethernet communication link.

7. A video image processing device, comprising:
a receiver configured to receive a residual bitstream and compressed video image data via a communication link; and
processor circuitry communicatively coupled to the receiver, the processor circuitry including:
a census digit generator configured to generate one or more residual census digit planes based on the received residual bitstream;
a decoder configured to receive the compressed video image data from the receiver and decompress the compressed video image data to generate decompressed video image data;
a census transform configured to generate one or more decompressed census digit planes based on the decompressed video image data;
an adder configured to receive the one or more residual census digit planes and the one or more decompressed census digit planes, and to generate one or more reconstructed census digit planes based on the one or more residual census digit planes and the one or more decompressed census digit planes; and
a signature vector generator configured to generate a signature vector based on the one or more reconstructed census digit planes.

8. The video image processing device of claim 7, wherein the decompressed video image data is a decompressed version of compressed video image data received by the receiver.

9. The video image processing device of claim 7, wherein the signature vector generator is configured to generate the signature vector based on a sum of a census digit of the one or more decompressed census digit planes and a corresponding census digit of the one or more residual census digit planes.

10. The video image processing device of claim 7, wherein the adder is configured to add a census digit of the one or more decompressed census digit planes and a corresponding census digit of the one or more residual census digit planes to generate the one or more reconstructed census digit planes.

11. The video image processing device of claim 10, wherein the one or more reconstructed census digit planes correspond to one or more census digit planes generated from uncompressed video image data.

12. A video image processing method, comprising:
receiving uncompressed video image data from an image sensor;
compressing the uncompressed video image data to generate compressed video image data;
decompressing the compressed video image data to generate uncompressed video image data;
generating one or more uncompressed census digit planes using the uncompressed video image data;
generating one or more decompressed census digit planes using the decompressed video image data, wherein the decompressed video image data was previously compressed;
generating one or more residual census digit planes based on the one or more uncompressed census digit planes and the one or more decompressed census digit planes;
generating a residual bitstream based on the one or more residual census digit planes; and
transmitting the compressed video image data and the residual bitstream via a communication link.

13. The video image processing method of claim 12, further comprising:
receiving the residual bitstream via the communication link;
generating one or more reconstructed residual census digit planes based on the received residual bitstream;
generating one or more second decompressed census digit planes based on second decompressed video image data;
generating one or more reconstructed census digit planes based on the one or more reconstructed residual census digit planes and the one or more second decompressed census digit planes; and
generating a signature vector based on the one or more reconstructed census digit planes.

14. The video image processing method of claim 13, further comprising:
  receiving the compressed video image data via the communication link; and
  decompressing the compressed video image data to generate the second decompressed video image data.

15. The video image processing method of claim 13, wherein the generating the one or more residual census digit planes includes subtracting a census digit of the one or more decompressed census digit planes from a corresponding census digit of the one or more uncompressed census digit planes to generate the one or more residual census digit planes; and
  wherein the generating the one or more reconstructed census digit planes includes adding a census digit of the one or more reconstructed residual census digit planes and a corresponding census digit of the one or more second decompressed census digit planes to generate the one or more reconstructed census digit planes.

16. The video image processing device of claim 1, wherein:
  for a selected pixel in the uncompressed video image data having a pixel intensity, each of the one or more uncompressed census digit planes represents a neighboring pixel intensity of a neighboring pixel relative to the pixel intensity of the selected pixel in the uncompressed video image data, wherein the neighboring pixel is located at a different predetermined location relative to the selected pixel for each of the one or more uncompressed census digit planes, and
  for a selected pixel in the decompressed video image data having a pixel intensity, each of the one or more decompressed census digit planes represents a neighboring pixel intensity of a neighboring pixel relative to the pixel intensity of the selected pixel in the decompressed video image data, wherein the neighboring pixel is located at a different predetermined location relative to the selected pixel for each of the one or more decompressed census digit planes.

17. The video image processing device of claim 7, wherein:
  for a selected pixel in the decompressed video image data having a pixel intensity, each of the one or more decompressed census digit planes represents a neighboring pixel intensity of a neighboring pixel relative to the pixel intensity of the selected pixel in the decompressed video image data, wherein the neighboring pixel is located at a different predetermined location relative to the selected pixel for each of the one or more decompressed census digit planes.

18. The video image processing method of claim 12, wherein:
  for a selected pixel in the uncompressed video image data having a pixel intensity, each of the one or more uncompressed census digit planes represents a neighboring pixel intensity of a neighboring pixel relative to the pixel intensity of the selected pixel in the uncompressed video image data, wherein the neighboring pixel is located at a different predetermined location relative to the selected pixel for each of the one or more uncompressed census digit planes, and
  for a selected pixel in the decompressed video image data having a pixel intensity, each of the one or more decompressed census digit planes represents a neighboring pixel intensity of a neighboring pixel relative to the pixel intensity of the selected pixel in the decompressed video image data, wherein the neighboring pixel is located at a different predetermined location relative to the selected pixel for each of the one or more decompressed census digit planes.

19. The video image processing device of claim 1, wherein the image sensor is configured to capture a video image and generate the uncompressed video image data based on the video image.

20. The video image processing method of claim 12, further comprising:
  using the image sensor, capturing a video image and generating the uncompressed video image data based on the video image.

* * * * *